United States Patent [19]

Walden

[11] 4,228,364

[45] Oct. 14, 1980

[54] ENERGY MANAGEMENT SYSTEM

[76] Inventor: Jack O. Walden, 789 Georgia Ave., Sunnyvale, Calif. 94086

[21] Appl. No.: 912,213

[22] Filed: Jun. 5, 1978

[51] Int. Cl.² ............................................. H02J 3/18
[52] U.S. Cl. ..................................... 307/38; 307/115
[58] Field of Search ...................... 307/62, 35, 38, 41, 307/42, 115; 340/309.6

[56] References Cited

U.S. PATENT DOCUMENTS

| | | | |
|---|---|---|---|
| 3,577,004 | 5/1971 | Tsoutsas | 307/41 |
| 3,631,447 | 12/1971 | Sulat | 340/309.6 |
| 3,712,987 | 1/1973 | McKeown | 307/41 |
| 4,024,411 | 5/1977 | Bengoa | 307/41 |
| 4,100,426 | 7/1978 | Baranowski | 307/35 |

*Primary Examiner*—John Gonzales
*Assistant Examiner*—S. D. Schreyer

*Attorney, Agent, or Firm*—Claude A. S. Hamrick

[57] ABSTRACT

An energy management system for reducing the power consumption of a plurality of loads and including a seven-day timer, a 24-hour timer and a fractional day timer such as a 30-minute timer, each controlling a plurality of subcircuits such that each subcircuit is operative to interrupt the flow of energy to it's associative load at selected times on weekends, in the evening and at synchronized periods throughout the day, the latter periods being synchronized with the other subcircuits, so as to reduce the peak energy demand and to improve the efficiency of the loads. The energy management system further includes circuitry for sequentially shutting down selected loads when the peak energy demand exceeds predetermined levels and circuitry for sequentially energizing the loads following a power failure.

5 Claims, 1 Drawing Figure

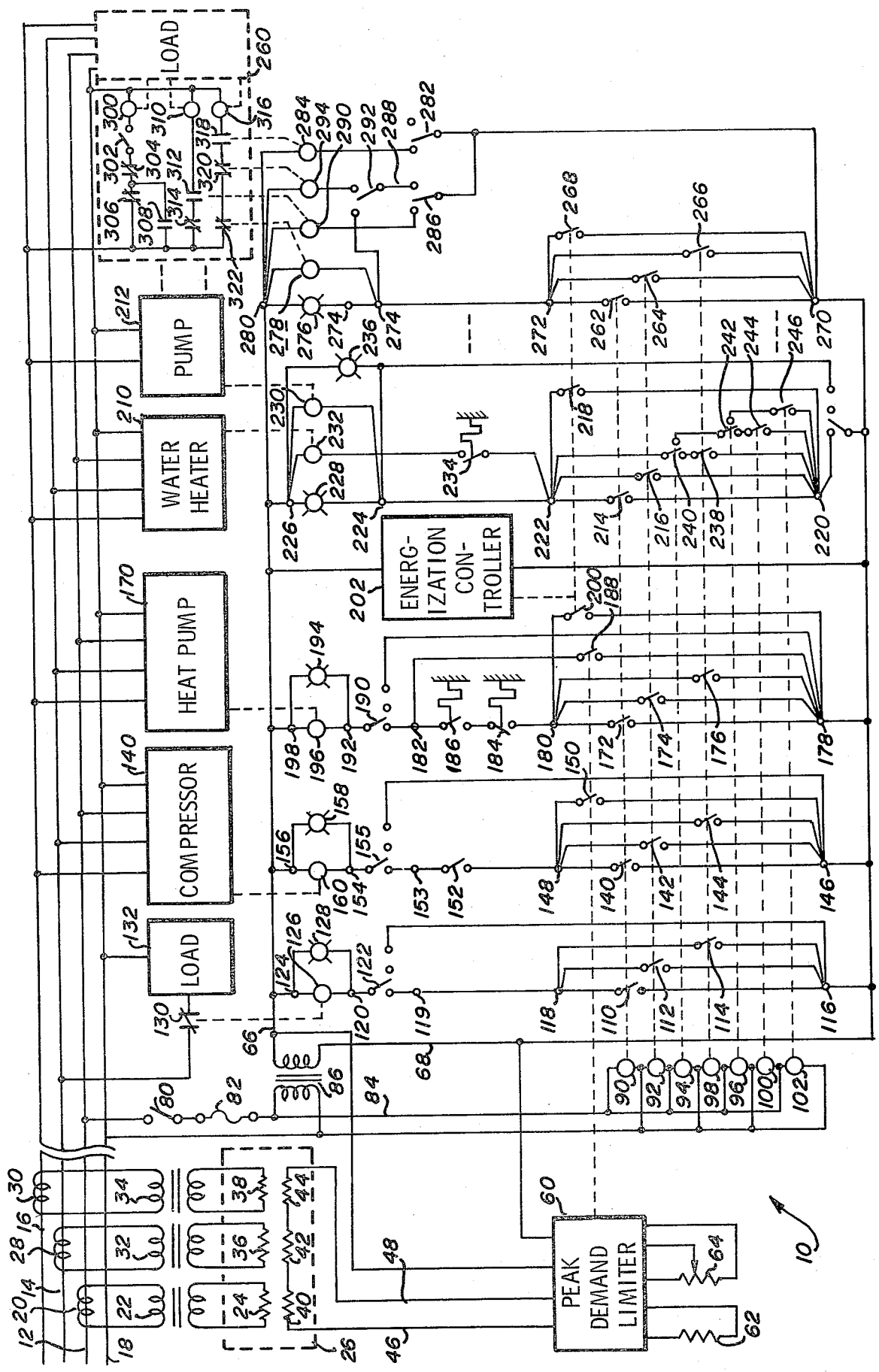

ENERGY MANAGEMENT SYSTEM

BACKGROUND OF THE INVENTION

1. Field of the Invention

The present invention relates generally to energy distribution systems and more particularly to an energy management system for reducing energy consumption and improving consumption efficiency.

2. Description of the Prior Art

Recently the cost of energy has increased sharply. Although recent increases are due in large part to artificial factors such as the maintenance of oil prices by large cartels, the increases also reflect the growing scarcity of energy producing fuels.

In order to lessen the immediate impact of such scarcities as well as to postpone the inevitable day when these fuels are exhausted, it is in the public interest that everyone conserve energy. Of course, the previous increases in the cost of energy coupled with the inevitable larger future increases make conservation even more individually attractive.

Unfortunately, many energy consuming devices and their loads were designed during the time when energy was cheap and thus conservation seemed relatively unimportant. For example, buildings were constructed with little or no insulation, and heating/cooling systems were constructed in the most expedient fashion. In fact, it is not uncommon to find heating and cooling systems which are designed to operate simultaneously. In other words, in such systems, heated air is combined with cooled air in order to achieve a desired environmental temperature. Because of the impracticalities of immediately replacing such systems, it is important that existing systems be made to operate in the most energy-efficient fashion.

Although sophisticated prior art systems exist, such as complex computers for regulating the energy consumption of office buildings which they control, a need exists for a much more basic system. Such a basic system is desirable because as the sophistication and complexity of systems increase, so do the system costs and failure rates. These factors make such prior art energy management systems unattractive to the small to medium sized energy users. As a consequence, as the complexity of such systems is decreased, their acceptance and thus the quantity of scarce fuels saved will increase.

Of course, in so far as the cost of energy is based upon the total amount of energy used, a reduction in usage will reduce the costs accordingly. It should be noted however, that cost savings can be accomplished without a corresponding decrease in consumption by orchestrating the usage. In other words, it is common to charge for energy not only based upon the total amount used, but upon the peak demand for energy. Thus, by orchestrating the timing when various loads consume energy, large peak demands may be eliminated and the bill for energy reduced.

In addition, it is possible to increase efficiency of certain loads. In other words, it is possible to reduce the amount of energy these loads consume without decreasing the amount of work they perform. Such a load may operate inefficiently, for example, because of short cycling. The efficiency of such a load may be improved by regulating the cycling of such a load such as by periodically preventing energy from reaching the load for periods which are relatively short such that the load will still perform its intended function.

SUMMARY OF THE PRESENT INVENTION

It is therefore an object of the present invention to provide an energy management system for reducing the amount of energy which is consumed by a plurality of loads.

Another object of the present invention is to provide an energy management system for reducing the peak energy demand of a plurality of loads.

Still another object of the present invention is to provide an energy management system which may be used to improve the efficiency of certain loads.

Briefly, the preferred embodiment of the present invention comprises a step down transformer connected to the AC power line for developing a 24-volt potential, three timers including a seven-day timer, a 24-hour timer, and a fractional day timer such as a 30-minute timer, all of which are connected to the AC line and a plurality of load control subcircuits each including a first switch controlled by the seven-day timer, a second switch controlled by the 24-hour timer, a third switch controlled by the 30-minute timer, the timers being connected in parallel each to one side of the 24-volt potential and a load controlling shut-down relay connected to the other side of the 24-volt potential and coupled by an optional override circuit to the switches, such that the flow of energy to an associated load is interpreted during preselected periods. Additionally, each load control subcircuit may further include an additional pair of switches connected in parallel with the other switches, one being driven by a modutrol motor which senses the peak demand and shuts down preselected loads when the energy demand exceeds a predetermined level, the other switch being driven by a motor so as to cause sequential energization of the loads following a power failure.

The efficient utilization of energy made possible by the present invention is thus a material advantage thereof.

The reduction in peak energy demand made possible by the present invention is another advantage thereof.

Still another advantage of the present invention is its simplicity.

These and other objects and advantages of the present invention will no doubt become apparent to those skilled in the art after having read the following detailed description of the preferred embodiment which is illustrated in the drawing.

IN THE DRAWING

FIG. 1 is a schematic view showing a power management system in accordance with the present invention.

DETAILED DESCRIPTION OF THE PREFERRED EMBODIMENT

Turning now to FIG. 1, a schematic diagram illustrating a preferred embodiment of an energy management system in accordance with the present invention is shown. The system, which is generally designated by the number 10, is connected to the power distribution wires, which in this embodiment includes three wires 12, 14 and 16 and a neutral wire 18, for coupling power to three phase loads. Magnetically coupled to wire 12, at a point near where the service wires are connected thereto, so as to monitor the current supplied thereby, is a current transformer 20. The current transformer is connected to the primary winding of an isolation transformer 22 which has a secondary winding which is connected to a load resistor 24 of a transducer 26.

Responsive to the current flowing through wire 12, current transformer 20 is operative to develop a current in the primary winding of transformer 22 which causes an isolated current to flow through the heat load resistor 24. Thus, resistor 24 is heated to a temperature which is proportional to the power flowing through wire 12.

In a similar fashion a current transformer 28 and a current transformer 30 are coupled to wires 14 and 16 to develop currents which are proportional to the current flowing through these wires, which currents are coupled by a transformer 32 and a transformer 34 to a load resistor 36 and a load resistor 38, respectively.

Transducer 26 also includes three thermisters 40, 42 and 44, which are series connected between a pair of lines 46 and 48 and disposed in proximity with load resistors 24, 36 and 38, respectively. Thus, transducer 26 develops an impedance between lines 46 and 48 which is proportional to the total amount of energy which is consumed by the loads which are connected to the wires. Although in the preferred embodiment three current transformers are employed, where the loads are generally balanced, it has been found that satisfactory operation may be obtained using only a single current transformer, such as current transformer 20.

Connected to lines 46 and 48 is a peak demand limiter 60, which is also connected to a compensating thermister 62, a set point adjusting potentiometer 64 and a pair of wires 66 and 68 which couple operating power to the limiter.

In the preferred embodiment, peak demand limiter 60 includes a switching bank, such as those used with the series of timers which are designated MP by the Eagle Signal Corporation, and a modutrol motor, such as that designated M7044 by the Honeywell Corporation. As used, the motor normally associated with the timer is removed and the modutrol motor is substituted therefor.

Connected between wire 12 and neutral wire 18 by a switch 80, a fuse 82 and a line 84, is the primary winding of a 24-volt transformer 86 having a secondary winding which is connected between lines 66 and 68.

Also connected between line 84 and wire 18 is a number of timers including a seven-day timer 90, three 24-hour timers 92, 94 and 96 and three fractional day timers 98, 100 and 102. In the preferred embodiment 30-minute timers are employed for the fractional day timers although other timers such as 45-minute or one hour timers may also be employed. Preferably, timers such as ones from the series which is designated MP by the Eagle Signal Corporation are employed.

Driven by the timers are a number of subcircuits, each of which controls an associated load. All of the subcircuits include at least three, preferably parallel connected, switches, a switch which is driven by 7-day timer 90, a switch which is driven by 24-hour timer 92, and another switch which is driven by fractional day timer 98.

One such subcircuit includes three switches 110, 112 and 114 which are driven by timers 90, 92 and 98, respectively, and which are each connected between a pair of terminals 116 and 118. Terminal 118 is connected by a jumper to a terminal 119 and terminal 116 is connected to line 68.

Connected to terminals 116, 119 and a terminal 120 is a mode switch 122. The switch has an automatic position in which signals are coupled between terminals 119 and 120, an on position and an off position in which signals are coupled between terminals 116 and 120.

Connected between terminal 120 and a terminal 124, which is connected to line 66, is an armature of a relay 126 and an indicator lamp 128. The relay has a normally closed contact 130 for coupling power from wire 14 to a load 132 which is also connected to neutral wire 18.

In the preferred embodiment, switch 110 is adjusted so that it will close during a selected period on weekends, and switch 112 is adjusted to close during a selected period in the evening hours. In addition, switch 114 is adjusted so as to be actuated during a selected portion of each 30-minute interval throughout the day.

It will be seen that when mode switch 122 is in the automatic position, whenever switch 110, switch 112 or switch 114 closes, 24-volts will be coupled to indicator lamp 128 and relay 126. In addition to causing illumination of the indicator lamp, the 24-volt potential will actuate the relay interrupting the flow of power to the load.

A somewhat similar subcircuit is used for interrupting the flow of power from the power distribution wires to a compressor 140. This subcircuit, in addition to having three switches 140, 142 and 144, which are connected between a pair of terminals 146 and 148 which are controlled by 7-day timer 90, 24-hour timer 92, and 30-minute timer 98, respectively, has a switch 150 which is controlled by peak demand limiter 60 and which is connected between these terminals.

The subcircuit further includes a reverse operating pressure switch 152 connected between terminal 148 and a terminal 153. In other words, the switch is one which interrupts an electrical path when the pressure developed by the compressor drops below a predetermined minimum pressure. Connected to terminals 153, 146 and a terminal 154 is an auto-on-off mode switch 155, and connected between terminal 154 and a terminal 156, which is connected to line 66, is both an indicator lamp 158 and an armature of a relay 160.

The subcircuit operates in a fashion similar to the previously described subcircuit in that power is prevented from reaching compressor 140 on weekends, in the evening and during a selected portion of each 30-minute time interval during the day. Switches 114 and 144 are adjusted such that the periods when power is removed from their respective loads is synchronized so as to minimize the peak energy demand.

In addition, this subcircuit is controlled by peak demand limiter 60. The limiter, which responds to the peak energy demand as indicated by the temperature of resistors 40, 42 and 44 is operative to cause the closure of switch 150 to remove power from the compressor when the peak energy demand exceeds a predetermined level. This subcircuit further differs from the previous one in that when the peak pressure developed by compressor 140 drops below the preset pressure, the opening of switch 152 will override the operation of the time switches restoring power to the compressor.

A heat pump 170 is controlled by a subcircuit which includes a switch 172 which is driven by 7-day timer 90, a switch 174 which is driven by 24-hour timer 92, and a switch 176 which is driven by 30-minute timer 98. Each of these switches are connected so as to permit completion of an electrical path between a terminal 178 which is connected to line 68 and a terminal 180. Terminal 180 is connected to a terminal 182 by the series connection of two reverse acting thermostats 184 and 186. In other words, a thermostat which completes an electrical path when the temperature exceeds a preset value (or a cooling thermostat) is used for heating thermostat 184 and one which breaks an electrical path when the temperature exceeds a somewhat higher preset value (or a heating thermostat) is used for cooling thermostat 186.

Terminal 182 is connected to terminal 178 by a switch 188 which is driven by peak demand limiter 60. Terminal 182 is also connected to an auto-on-off mode switch 190 which is additionally connected to terminal 178 and a terminal 192. As in previously described subcircuits, terminal 192 is connected both by an indicator lamp 194 and a heat pump controlling relay 196 to a terminal 198 which is connected to line 66.

In this subcircuit, an additional switch 200, which is connected between terminal 178 and terminal 180 is employed. This switch is driven by an energization controller 202 which is connected between lines 66 and 68 receive the 24-volt potential developed therebetween.

In the preferred embodiment, the energization controller includes a switch bank such as those used in the series of timers which is designated MP by the Eagle Signal Corporation. The motor of the timer is replaced by a modutrol motor such as that designated M846A1027 or a damper motor designated M836A1042 by the Honeywell Corporation.

When thermostats 184 and 186 are closed, this subcircuit operates as previously discussed, removing power from heat pump 170 during preset periods on weekends, in the evening and portions of the day time periods which are synchronized with other subcircuits.

Should the temperature fall below the preset lower limit as determined by thermostat 184 or exceed the preset upper limit as determined by thermostat 186, the electrical path between terminals 180 and 182 will be broken preventing the closure of relay 196 and thus preventing the interruption of power to heat pump 170 until the temperature is restored to the operating range.

As in the previously described subcircuit, if the peak energy demand, as measured by peak demand limiter 60, exceeds a predetermined value, a limiter driven switch, switch 188, will cause deenergization of the load, heat pump 170. Since switch 188, is connected to terminal 182 rather than terminal 180, when the preset value is exceeded, power will be removed from the heat pump irrespective of the state of thermostats 184 and 186. Preferably, switch 188 should be adjusted to close at a different preset level than other ones of the limiter driven switches so that as the peak energy demand increases, the affected loads will be sequentially deenergized based upon a predetermined ranking.

During a power failure, energization control 202 causes closure of switch 200 to cause the actuation of relay 196 following the failure to momentarily prevent power from reaching heat pump 170. A predetermined time delay after power is again available, the energization controller will open switch 20 to again energize the heat pump. The time delay chosen for switch 200 is synchronized with that of other switches controlled by the energization controller so as to avoid a current surge which would otherwise result if all of the loads were energized simultaneously.

A subcircuit for controlling a water heater 210 and an associated pump 212 is similar to previously described subcircuits in that a switch 214 driven by 7-day timer 90, a switch 216 driven by 24-hour timer 92 and a switch 218 driven by energization controller 202 are each connected between a terminal 220 and a terminal 222. Terminal 222 is connected to terminal 224. Connected between terminal 224 and a terminal 226, which is connected to line 66, is both an indicator lamp 228 and a pump controlling relay 230.

Power to water heater 210 is independently controlled by another relay 232 which is connected to terminal 226 and by a reverse acting thermostat 234 to terminal 222.

In this subcircuit, power flow to water heater 210 and pump 212 will be interrupted during selected periods on weekends, and in the evenings as previously described. The power interruption to water heater 210 will be overridden when thermostat 234 opens because the water heater temperature has dropped below a predetermined level which is set by the thermostat.

This subcircuit differs from those previously described in that an additional remotely mounted indicator lamp 236 is connected in parallel with lamp 228 to provide remote indication of the operation of the energy management system, and a remote auto-on-off mode switch 237 is connected to indicator lamp 236, terminal 220 and line 68 to provide remote control of the system. This subcircuit further differs from the previously described subcircuits in that the length of each of the daytime power interruptions is changed throughout the day. More specifically, a switch 238 which is driven by 30-minute timer 98 is connected between terminals 220 and 222 by a switch 240 which is driven by 24-hour timer 94. Switch 240 selectively couples signals from terminal 222 to switch 238 or a switch 242 which is driven by 24-hour timer 96. This latter switch further selectively couples the signals to terminal 220 by way of a switch 244 driven by 30-minute timer 100 or a switch 246 driven by 30-minute timer 102.

This arrangement permits an interruption period of a first length, as set by switch 238, to be used in the morning, for example, another interruption period, of length determined by switch 244, to be used in the afternoon and a third interruption period, of length determined by switch 246, to be used in the evening, the change over times being set by switches 240 and 242.

Control of a cooling system 260 is accomplished by a subcircuit which includes three switches 262, 264 and 266 that are driven by timers 90, 92 and 98 to orchestrate the interruption of power to the cooling system at selected periods on weekends, in the evening and during the day in a fashion as previously described. Also included is a switch 268 which is driven by energization controller 202 to coordinate the time at which the cooling system is energized following a power outage. These switches are each connected between a pair of terminals including a terminal 270 which is connected to line 68 and a terminal 272 which is connected to a terminal 274. An indicator lamp 276 and a relay 278 are connected between terminal 274 and a terminal 280 which is connected to line 66.

Also connected to terminal 270 is the common contact of an enthalpy control 282 which has a high enthalpy contact that is connected by a relay 284 to terminal 280. Another enthalpy control 286 has a common contact which is connected to terminal 270, a low enthalpy contact which is connected to a line 288 and a high enthalpy contact which is connected by a relay 290 to terminal 280. A third enthalpy control 292 has a common contact which is connected to line 288, a low enthalpy contact which is connected to a relay 294 to terminal 280 and a high enthalpy contact which is connected to terminal 274.

These relays are used to control the operation of cooling system 260. More specifically, a pneumatic solenoid valve 300, which controls the fresh air and return air dampers of the cooling system by controlling the air line on the associated economizer system, is connected between wire 16 and wire 18 by an enthalpy control 302, a normally closed contact 304 of relay 294 and a normally closed contact 306 of relay 290. A normally open relay contact 308, which is controlled by relay 278, is connected in parallel with relay contact 306. A liquid line solenoid valve 310 is connected between wires 16 and 18 by a normally open relay contact 312, which is controlled by relay 290, and a normally closed relay contact 314, which is controlled by relay 278. Also connected between wires 16 and 18 is the series connection of a liquid line solenoid valve 316, a normally open relay contact 318, which is controlled by relay 284, a normally closed relay contact 320, which is controlled by relay 294, and a normally closed relay contact 322, which is controlled by relay 278.

Enthalpy controls 282, 286 and 292 are located in the return air duct so as to monitor the conditions of the air in the building, and enthalpy control 302 is located so as to monitor the conditions of the outside air. In the preferred embodiment these enthalpy controls are devices such as those designated H205A by the Honeywell Corporation.

For analysis, it is first assumed that the temperature and humidity of the air in the return duct is relatively low. In this case, relays 284 and 290 will be deenergized and relay 294 will be energized opening contact 204 to prevent energization of solenoid 300. Thus, the return air damper will be open and the fresh air damper will be closed permitting efficient heating, if necessary.

Additionally, solenoids 310 and 316 will be in a deenergized state preventing the flow of refrigerant through each of the cooling systems so that each system will pump down and shut off. In this state, little energy is consumed by the cooling system, and the closure of switch 262, 264 and 266 will not effect the state of the cooling system.

Should the enthalpy of the returned air increase so as to cause the state of enthalpy control 292 to change, relay 294 will be deenergized closing relay contact 304 and relay 278 will be energized closing relay contact 308. In this state, if the enthalpy of the outside air is relatively low and thus enthalpy control 302 is closed, solenoid valve 300 will be energized causing the circulation of fresh air. Again, little energy is consumed and closure of the timer switches will not effect operation of the cooling system.

If the closure of enthalpy control 292 was caused by the return air being relatively hot rather than humid an introduction of fresh air may be sufficient to cool the building. Where, however, the return air is relatively humid or where the introduction of fresh air is ineffective in cooling the building, the closure of enthalpy control 286 may occur. In this state, relays 284 and 294 will be deenergized and relay 290 will be energized opening relay contact 306 and closing relay contact 312. During the time when the timer driven switches are open, solenoid valve 300 will be deenergized causing the circulation of the return air and solenoid valve 310 will be energized activating the first stage of cooling. During the periods when switch 262, switch 264 or switch 266 is closed, energizing relay 278, solenoid 300 will be energized to introduce fresh air into this system and solenoid 310 will be deenergized inhibiting the first stage of cooling.

Finally, should the enthalpy of the return air continue to increase, enthalpy control 282 will energize relay 284 closing relay contact 318. In this state, when the timer driven switches are open, both stages of cooling will be employed, and when one or more of the timer driven switches are closed, both stages of cooling will be deactuated and fresh air will again be circulated.

Where the enthalpy of the outside air is relatively high, enthalpy control 302 will prevent the energization of solenoid 300 preventing the introduction of fresh air.

The above description of the preferred embodiment of the present invention illustrates the control of loads which were chosen to best illustrate the operation of the invention. For clarity, only those switches and terminals of each subcircuit which are actually utilized to control the respective load are shown. It is, of course, obvious that in most applications it is more convenient to utilize a standard energy management system in which each subcircuit includes a complete set of terminals and switches. It is then a relatively simple matter to disconnect switches and/or reconfigure each subcircuit using jumpers such that a large number of similar loads and/or a large class of diverse types of loads may be controlled as suggested by these teachings. In other words, in each subcircuit a pair of terminals between which are connected switches as illustrated connected between terminals 220 and 222 and a peak demand limiter controlled switch are included. Additionally, the subcircuit includes an auto-on-off mode switch, a remote auto-on-off mode switch, a relay, an indicator lamp, a remote indicator lamp and associates terminals as illustrated in the subcircuit which controls water heater 210. To appropriate subcircuits additional relays, thermostats and enthalpy controls may be added as appropriate to control specified loads.

In addition to minor variations of the present invention which may be necessary or desirable in order to accommodate a specific type of load, certain other modifications of the present invention are contemplated. For example, although electromechanical time switches are employed in the preferred embodiment, other switches of the electronic or microprocessor controlled variety may also be employed. Also, although the time switches in each subcircuit are connected in parallel, they may alternately be connected in series where the appropriate relay contacts are employed. The parallel connection is preferred; however, since it will result in energization of the loads for certain failure modes of the system, such as the loss of the 24-volt potential.

It is contemplated that after having read the preceding disclosure certain other alterations and modifications of the present invention will no doubt become apparent to those skilled in the art. It is therefore intended that the following claims be interpreted to cover all such alterations and modifications as fall within the true spirit and scope of the invention.

What is claimed is:

1. An energy management system for reducing the power consumption of a plurality of normally energized loads comprising:
   means providing a source of interrupter actuating voltage;
   first timing means having a 168-hour timing cycle;
   second timing means having a 24-hour timing cycle;

third timing means having a fractional day timing cycle; and a plurality of independently acting subcircuits each including interrupting means capable of interrupting the flow of energy to a particular one of said plurality of loads, first switching means responsive to said first timing means and operative to apply said actuating voltage to apply said actuating voltage to said interrupting means so as to cause it to interrupt the flow of energy to its corresponding load during a selected period of said 168-hour timing cycle, second switching means independent of said first switching means but connected in parallel circuit therewith and responsive to said second timing means and operative to apply said actuating voltage to said interrupting means so as to cause it to interrupt the flow of energy to said corresponding load during a selected period of said 24-hour cycle, and third switching means independent of said first and second switching means but connected in parallel circuit therewith and responsive to said third timing means and operative to apply said actuating voltage to said interrupting means so as to cause it to interrupt the flow of energy to said corresponding load during a selected portion of the fractional day timing cycle.

2. An energy management system as recited in claim 1 wherein at least one of said plurality of subcircuits further includes means responsive to a predetermined condition and operative to override said first switching means, said second switching means, and said third switching means whereby the coupling of energy to said respective one of said plurality of loads is resumed.

3. An energy management system as recited in claim 1 wherein the timing of the energy interruption effectuated by the third switching means of at least one of said plurality of subcircuits is coordinated with the energy interruption effectuated by the third switching means of at least one other of said plurality of subcircuits so as to reduce the peak demand for energy of said plurality of loads.

4. An energy management system as recited in claim 1 further comprising means for monitoring the level of power which is consumed by said plurality of loads and wherein at least one of said plurality of subcircuits further includes means responsive to said power level monitoring means and operative to cause the corresponding interrupting means to interrupt the flow of energy to the load associated with said one of said subcircuits when the level of power consumption of said plurality of loads exceeds a predetermined level.

5. An energy management system as recited in claim 1 further comprising means for monitoring the availability of energy to drive said plurality of loads and wherein at least one of said plurality of subcircuits includes means responsive to said energy availability monitoring means and operative to cause the corresponding interrupting means to interrupt the flow of energy to the load associated with said one of said plurality of loads for a predetermined period following the time when energy is available following a power failure so as to prevent a power surge.

* * * * *